Patented Feb. 27, 1940

2,191,740

UNITED STATES PATENT OFFICE

2,191,740

SYMMETRICAL DI-HYDROXYALKYLATED AMINOARSENOBENZENES

Alfred Fehrle, Bad Soden in Taunus, and Paul Fritzsche, Frankfort-on-the-Main-Hochst, Germany, assignors to Winthrop Chemical Company, New York, N. Y., a corporation of New York No Drawing. Application December 16, 1937, Serial No. 180,154. In Germany December 19, 1936

2 Claims. (Cl. 260—445)

The present invention relates to symmetrical di-hydroxyalkylated aminoarsenobenzenes.

It is known that primary aminobenzene arsonic acids which may still contain other substituents in the benzene nucleus form during the reaction symmetrical aminoarsenobenzenes insoluble in water.

Now we have found that symmetrical di-hydroxyalkylated aminoarsenobenzenes very readily soluble in water are obtained by the introduction of two equal or different hydroxyalkyl radicals into the amino group of aminobenzene arsonic acids and a subsequent reduction of these acids, for instance by means of hypophosphorous acid or sodium hydrosulfite. In the same manner the arsonic acids may first be transformed into the corresponding arsine oxides which are then reduced in an acetic acid solution by means of sodium amalgam to obtain the free arsenobenzenes. Furthermore the symmetrical arsenobenzene is directly formed by the action of an arsine oxide upon the corresponding arsine in an aqueous solution.

By the preceding introduction of the two equal or different hydroxyalkyl radicals into the primary arsonic acids performed in known manner by the reaction with alkylene oxides the position of the various hydroxyalkyl radicals in the dihydroxyalkylated aminoarsenobenzenes obtained by the reduction of the acids is also exactly defined.

The compounds thus obtainable correspond to the following general formula:

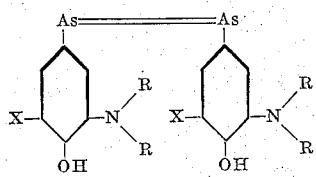

wherein R stands for a hydroxyalkyl radical and X stands for hydrogen or for the group

CH₃.CO.NH—

All these compounds form yellow powders which are insoluble in ethyl alcohol and ether and readily soluble in water. They are distinguished by a high non-toxidity and show, contrary to the monohydroxyalkylated or non-hydroxyalkylated aminoarsenobenzenes, only a very small irritating effect when subcutaneously injected.

The following examples serve to illustrate the invention, but they are not intended to limit it thereto:

(1) 73.5 grams of the di-hydrochloride of 3,3'-di-(bis-dihydroxypropyl)-amino-4,4'-dihydroxy arsenobenzene are dissolved in 500 cc. of water, the strongly acid solution is rendered neutral to litmus paper by the addition of sodium carbonate and the clear yellow liquid is poured into ethyl alcohol.

3,3'-di(bis-dihydroxypropyl)-amino-4,4'-dihydroxyarsenobenzene of the formula

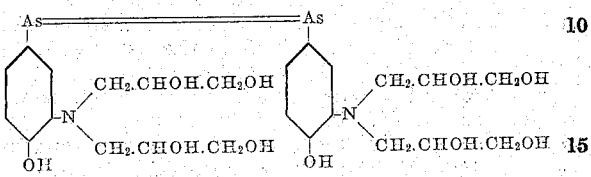

is obtained thereby in the form of a yellow precipitate which is filtered with suction, washed with ether and, if necessary, purified by again dissolving it in water and precipitating it in ethyl alcohol. The compound is readily soluble in water while showing a neutral reaction and is insoluble in ethyl alcohol and ether.

The same compound is obtained by dissolving 38.1 grams of 3-(bis-dihydroxypropyl)-amino-4-hydroxybenzene-1-arsonic acid in 38 cc. of water and heating the solution together with 120 grams of sodium hydrosulfite for about half an hour to 65° C. to 70° C. After the organic salts have been filtered with suction and acetone has been added the 3,3'-di-(bis-dihydroxypropyl)-amino-4,4'-dihydroxyarsenobenzene separates from the yellow filtrate in the form of a yellow precipitate which is filtered with suction and washed with acetone.

(2) 67.5 grams of the di-hydrochloride of 3,3'-bis-(dihydroxypropyl-hydroxyethyl)-amino-4,4'-dihydroxyarsenobenzene are neutralized as described in the foregoing example in the form of an aqueous solution with the aid of sodium carbonate. On addition of ethyl alcohol and ether a slightly yellow precipitate of 3,3'-bis-(dihydroxypropyl-hydroxyethyl)-amino-4,4'-dihydroxyarsenobenzene of the formula

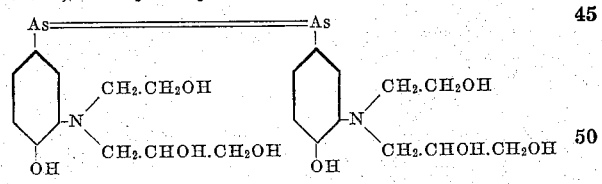

separates from this solution and is filtered with suction, washed with ether and dried. The preparation is insoluble in ethyl alcohol and ether and readily soluble in water.

(3) After the aqueous solution of 84.9 grams of the di-hydrochloride of 3,3'-di-(bis-dihydroxypropyl)- amino- 4,4'- dihydroxy- 5,5'-di-(acetylamino)-arsenobenzene has been neutralized by means of sodium carbonate and a mixture of ethyl alcohol and ether has been added, a yellow, pulverulent precipitate of 3,3'-di-(bis-dihydroxypropyl)- amino- 4,4'- dihydroxy- 5,5'- di-(acetylamino)-arsenobenzene of the formula

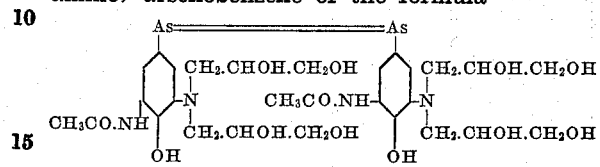

separates therefrom which is filtered with suction, washed with ether and, in order to completely purify it, is again dissolved in water and precipitated with the aid of ethyl alcohol and ether. The compound is likewise very readily soluble in water but insoluble in ethyl alcohol and ether.

The same compound is obtained by first transforming 3-(bis-dihydroxypropyl)-amino- 4-hydroxybenzene-5-acetylamino-1-arsonic acid with the aid of sulfurous acid and potassium iodide into 3-(bis-dihydroxypropyl)-amino-4-hydroxybenzene-5-acetylamino-1-arsine oxide as described in Example 1 of German Patent No. 638,265, dated April 3, 1935, in the name of I. G. Farbenindustrie Aktiengesellschaft, and 19.5 grams of this arsine oxide in an acetic acid solution are caused to react in portions with 85 grams of sodium amalgam of 4 per cent. strength. As soon as all the sodium amalgam has been consumed, the solution is decanted from mercury, the clear liquid is stirred into ten times its quantity of methyl alcohol, filtered off from the inorganic salts separated and the yellow filtrate is precipitated in ether. The 3,3'-di-(bis-dihydroxypropyl) - amino - 4,4' - dihydroxy - 5,5'- di- (acetylamino)-arsenobenzene separates thereby in the form of a yellow precipitate which is filtered with suction and washed with ether. If furthermore 19.5 grams of the above named arsine oxide and 18.8 grams of the corresponding arsine, which is obtained in the usual manner by the reduction of arsonic acid by means of zinc dust and hydrochloric acid, are dissolved in 50 cc. of water, the liquid assumes, while heated, a dark yellow color and, while stirring into a mixture of ethyl alcohol and ether, a yellow precipitate of 3,3'-di-(bis-dihydroxypropyl)-amino- 4,4' - dihydroxy - 5,5'- di -(acetylamino)-arsenobenzene is separated.

We claim:

1. The compounds of the following general formula:

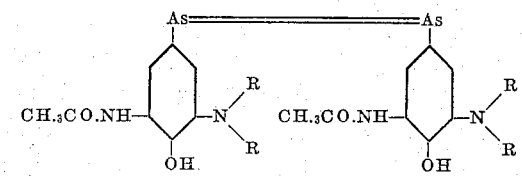

wherein R stands for a hydroxyalkyl radical, said compounds being yellow powders which are readily soluble in water and insoluble in ethyl alcohol and ether.

2. The compound of the following formula:

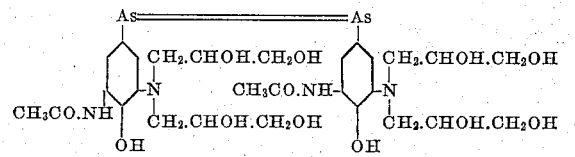

said compound being a yellow powder which is readily soluble in water and insoluble in ethyl alcohol and ether.

ALFRED FEHRLE.
PAUL FRITZSCHE.

CERTIFICATE OF CORRECTION.

Patent No. 2,191,740.   February 27, 1940.

ALFRED FEHRLE, ET AL.

It is hereby certified that the name of the assignee in the above numbered patent was erroneously described and specified as "Winthrop Chemical Company" whereas said name should have been described and specified as --Winthrop Chemical Company, Inc.", as shown by the record of assignments in this office; and that the said Letters Patent should be read with this correction therein that the same may conform to the record of the case in the Patent Office.

Signed and sealed this 20th day of June, A. D. 1944.

Leslie Frazer (Seal)   Acting Commissioner of Patents.